United States Patent
Mouli et al.

(10) Patent No.: US 12,443,913 B2
(45) Date of Patent: Oct. 14, 2025

(54) SYSTEMS AND METHODS FOR ROUTE ANALYSIS

(71) Applicant: United States Postal Service, Washington, DC (US)

(72) Inventors: Venkat Mouli, Chantilly, VA (US); Fharon M. Hicks, Washington, DC (US)

(73) Assignee: United States Postal Service, Washington, DC (US)

( * ) Notice: Subject to any disclaimer, the term of this patent is extended or adjusted under 35 U.S.C. 154(b) by 281 days.

(21) Appl. No.: 17/121,464

(22) Filed: Dec. 14, 2020

(65) Prior Publication Data

US 2021/0182787 A1 Jun. 17, 2021

Related U.S. Application Data

(60) Provisional application No. 62/947,425, filed on Dec. 12, 2019.

(51) Int. Cl.
| | | |
|---|---|---|
| *G06Q 10/083* | (2024.01) | |
| *G06Q 10/047* | (2023.01) | |
| *G06Q 10/0835* | (2023.01) | |
| *H04W 4/024* | (2018.01) | |
| *H04W 4/029* | (2018.01) | |

(52) U.S. Cl.
CPC ....... *G06Q 10/0838* (2013.01); *G06Q 10/047* (2013.01); *G06Q 10/08355* (2013.01); *H04W 4/024* (2018.02); *H04W 4/029* (2018.02)

(58) Field of Classification Search
CPC ............... G06Q 10/08; G06Q 10/0838; G06Q 10/08355
See application file for complete search history.

(56) References Cited

U.S. PATENT DOCUMENTS

| | | |
|---|---|---|
| 7,385,529 B2 | 6/2008 | Hersh |
| 9,086,292 B2 | 7/2015 | Horvitz et al. |
| 9,639,412 B1 | 5/2017 | Levy et al. |
| 9,928,475 B2 * | 3/2018 | Burnett .................. H04W 4/02 |
| 11,808,589 B1 * | 11/2023 | Dong ............... G06Q 10/08355 |

(Continued)

FOREIGN PATENT DOCUMENTS

WO   WO 2000-016293 A1   3/2000

OTHER PUBLICATIONS

L. Abbatecola, M. P. Fanti and W. Ukovich, "A review of new approaches for Dynamic Vehicle Routing Problem," 2016 IEEE International Conference on Automation Science and Engineering (CASE), Fort Worth, TX, USA, 2016, pp. 361-366, doi: 10.1109/COASE.2016.7743429. (Year: 2016).*

(Continued)

*Primary Examiner* — Scott M Tungate
(74) *Attorney, Agent, or Firm* — Knobbe, Martens, Olson & Bear LLP

(57) ABSTRACT

Systems and methods for analyzing and improving delivery resource operation and efficiency. A delivery resource carries a mobile computing device which transmits delivery information to a server. The server combines the delivery information with stored route information for the route the delivery resource traverses to identify anomalies, to change routing, to dispatch additional resources, provide delivery predictions, and to improve overall performance.

22 Claims, 6 Drawing Sheets

(56) References Cited

U.S. PATENT DOCUMENTS

| | | | |
|---|---|---|---|
| 2003/0036938 A1* | 2/2003 | Dutta | G06Q 10/06314 705/26.1 |
| 2006/0167734 A1 | 7/2006 | Scott et al. | |
| 2013/0297095 A1 | 11/2013 | Kwak | |
| 2013/0297524 A1 | 11/2013 | Lau | |
| 2014/0040166 A1* | 2/2014 | Handley | G08G 1/127 706/46 |
| 2014/0278070 A1 | 9/2014 | McGavran et al. | |
| 2014/0343839 A1* | 11/2014 | Lin | G01C 21/3641 701/425 |
| 2015/0177011 A1 | 6/2015 | Ibrahimi et al. | |
| 2016/0189526 A1* | 6/2016 | Kennedy | G08B 25/008 340/541 |
| 2017/0053234 A1 | 2/2017 | Lozito | |
| 2017/0262790 A1 | 9/2017 | Khasis | |
| 2018/0174446 A1 | 6/2018 | Wang | |
| 2019/0063939 A1 | 2/2019 | Chai et al. | |
| 2019/0102960 A1 | 4/2019 | Thibault et al. | |
| 2019/0108479 A1* | 4/2019 | Dearing | H04W 4/021 |
| 2019/0178672 A1 | 6/2019 | Woolley | |
| 2019/0178679 A1 | 6/2019 | Woolley | |
| 2020/0097908 A1 | 3/2020 | Glasfurd | |
| 2020/0200553 A1 | 6/2020 | Voznesensky et al. | |
| 2020/0334637 A1 | 10/2020 | Turner et al. | |
| 2020/0400439 A1 | 12/2020 | Thompson et al. | |
| 2020/0400441 A1 | 12/2020 | Efland | |
| 2021/0182757 A1 | 6/2021 | Kaneichi et al. | |
| 2022/0013014 A1 | 1/2022 | Xu et al. | |
| 2022/0036284 A1 | 2/2022 | Oyama | |
| 2022/0083925 A1 | 3/2022 | Varadarajan et al. | |
| 2022/0157167 A1 | 5/2022 | Gupta et al. | |
| 2022/0341747 A1 | 10/2022 | Levin et al. | |
| 2022/0373352 A1 | 11/2022 | Turner et al. | |
| 2022/0404162 A1 | 12/2022 | Williams | |
| 2024/0193535 A1 | 6/2024 | Turner et al. | |

OTHER PUBLICATIONS

Mbiydzenyuy, G. et al. "Road travel time prediction—A micro-level sampling approach," 16th International IEEE Conference on IntelligentTransportation Systems (ITSC 2013), The Hague, Netherlands, 2013, pp. 1613-1618, doi: 10.1109/ITSC.2013.6728460. (Year: 2013).

Marco, Diana et al., Freight distribution in urban areas: a method to select the most important loading and unloading areas and a survey tool to investigate related demand patterns, Springer Open, European Transport Research review, (https://etrr.springeropen .com/articles/10.1186/s 12544-020-00430-w) (Year: 2020).

Timpner, Julian et al., Query-response geocast for vehicular crowd sensing, Science Direct, Ad Hoc Networks vol. 36, Part 2, Jan. 2016, pp. 435-449 (https://www.sciencedirect.com/science/article/pi i/S 1570870515001286) (hereinafter "Timpner") (Year: 2016).

\* cited by examiner

SYSTEMS AND METHODS FOR ROUTE ANALYSIS

CROSS-REFERENCE TO RELATED APPLICATIONS

This application claims the benefit of U.S. Provisional Application Ser. No. 62/947,425, filed Dec. 12, 2019, entitled SYSTEMS AND METHODS FOR ROUTE ANALYSIS, the entirety of which is incorporated by reference herein in its entirety.

BACKGROUND

This disclosure relates to methods and systems for mapping routes of delivery resources and improving delivery efficiency.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages.

In a first aspect, a delivery route management system comprises a server in communication with a network, a route database in communication with the server, and a plurality of mobile computing devices. The route database stores route information corresponding to a plurality of delivery routes of a distribution network, the route information comprising baseline information corresponding to individual delivery routes of the plurality of delivery routes. The plurality of mobile computing devices are configured to be carried by delivery resources of the distribution network. Each mobile computing device is configured to generate periodic location data while being carried by a delivery resource servicing a delivery route of the plurality of delivery routes, the periodic location data comprising a plurality of location data points, and transmit the periodic location data to the server via the network. For the individual delivery routes, the server is configured to receive, from the mobile computing device carried by the individual delivery resource servicing the delivery route, the periodic location data corresponding to the delivery route for a given day; segment the periodic location data into a plurality of events and route segments for the delivery route based on the plurality of location data points and on route information in the route database corresponding to the delivery route; compare at least a portion of the segmented periodic location data to the baseline information in the route database corresponding to the delivery route; and update the baseline information corresponding to the delivery route in response to comparing the at least a portion of the segmented periodic location data to the baseline information corresponding to the delivery route.

In some embodiments, updating the baseline information corresponding to the delivery route comprises changing an average time associated with a first route segment of the plurality of events and route segments for the delivery route based on a time duration associated with the first route segment in the segmented periodic location data. In some embodiments, the baseline information in the route database comprises, for the individual delivery routes, individual baseline data sets associated with specific weekdays, months, or quarters. In some embodiments, updating the baseline information corresponding to the delivery route comprises updating an individual data set associated with a weekday, month, or quarter corresponding to the given day. In some embodiments, the route information further comprises geographical route boundary information corresponding to the individual delivery routes. In some embodiments, the server is further configured to detect out of bounds travel by a delivery resource based on the periodic location data and the geographical route boundary information and cause the mobile computing device carried by the delivery resource to provide a notification to the delivery resource indicative of the out of bounds travel. In some embodiments, the server is further configured to detect recurring out of bounds travel associated with a portion of an individual delivery route and modify the route information corresponding to the individual delivery route based on the recurring out of bounds travel. In some embodiments, the route information further comprises geofence data associated with particular events or route segments of the plurality of events and route segments, and the server segments the periodic location data based at least in part on the geofence data. In some embodiments, the server is further configured to provide an expected delivery window to a customer of the distribution network based on the route information. In some embodiments, each mobile computing device is further configured to receive, from the delivery resource, route condition information associated with individual route segments and transmit the route condition information to the server, wherein the server updates the baseline information based at least in part on the route condition information.

In a second aspect, a delivery route management method comprise receiving, at a server, periodic location data transmitted by a mobile computing device carried by a delivery resource servicing a delivery route, the periodic location data comprising a plurality of location data points corresponding to the delivery route for a given day; retrieving, from a route database in communication with the server, route information for the delivery route comprising baseline information corresponding to the delivery route; segmenting, by the server, the periodic location data into a plurality of events and route segments for the delivery route based on the plurality of location data points and on the route information for the delivery route; comparing, by the server, at least a portion of the segmented periodic location data to the baseline information corresponding to the delivery route; and updating, by the server, the baseline information corresponding to the delivery route in response to comparing the at least a portion of the segmented periodic location data to the baseline information corresponding to the delivery route.

In some embodiments, updating the baseline information corresponding to the delivery route comprises changing an average time associated with a first route segment of the plurality of events and route segments for the delivery route based on a time duration associated with the first route segment in the segmented periodic location data. In some embodiments, the baseline information corresponding to the delivery route comprises individual baseline data sets associated with specific weekdays, months, or quarters. In some embodiments, updating the baseline information corresponding to the delivery route comprises updating an individual data set associated with a weekday, month, or quarter corresponding to the given day. In some embodiments, the route information for the delivery route further comprises geographical route boundary information corresponding to the individual delivery routes. In some embodiments, the method further comprises detecting out of bounds travel by the delivery resource based on the periodic location data and the geographical route boundary information, and causing the mobile computing device to provide a notification to the delivery resource indicative of the out of bounds travel. In some embodiments, the method further comprises detecting recurring out of bounds travel associated with a portion of the delivery route, and modifying the route information for the delivery route based on the recurring out of bounds travel. In some embodiments, the route information for the delivery route further comprises geofence data associated with particular events or route segments of the plurality of events and route segments, and the periodic location data is segmented based at least in part on the geofence data. In some embodiments, the method further comprises providing an expected delivery window to a customer of the distribution network based on the route information. In some embodiments, the method further comprises receiving, from the mobile computing device, route condition information associated with individual route segments of the delivery route; and updating the baseline information based at least in part on the route condition information.

DETAILED DESCRIPTION

Figure 1:
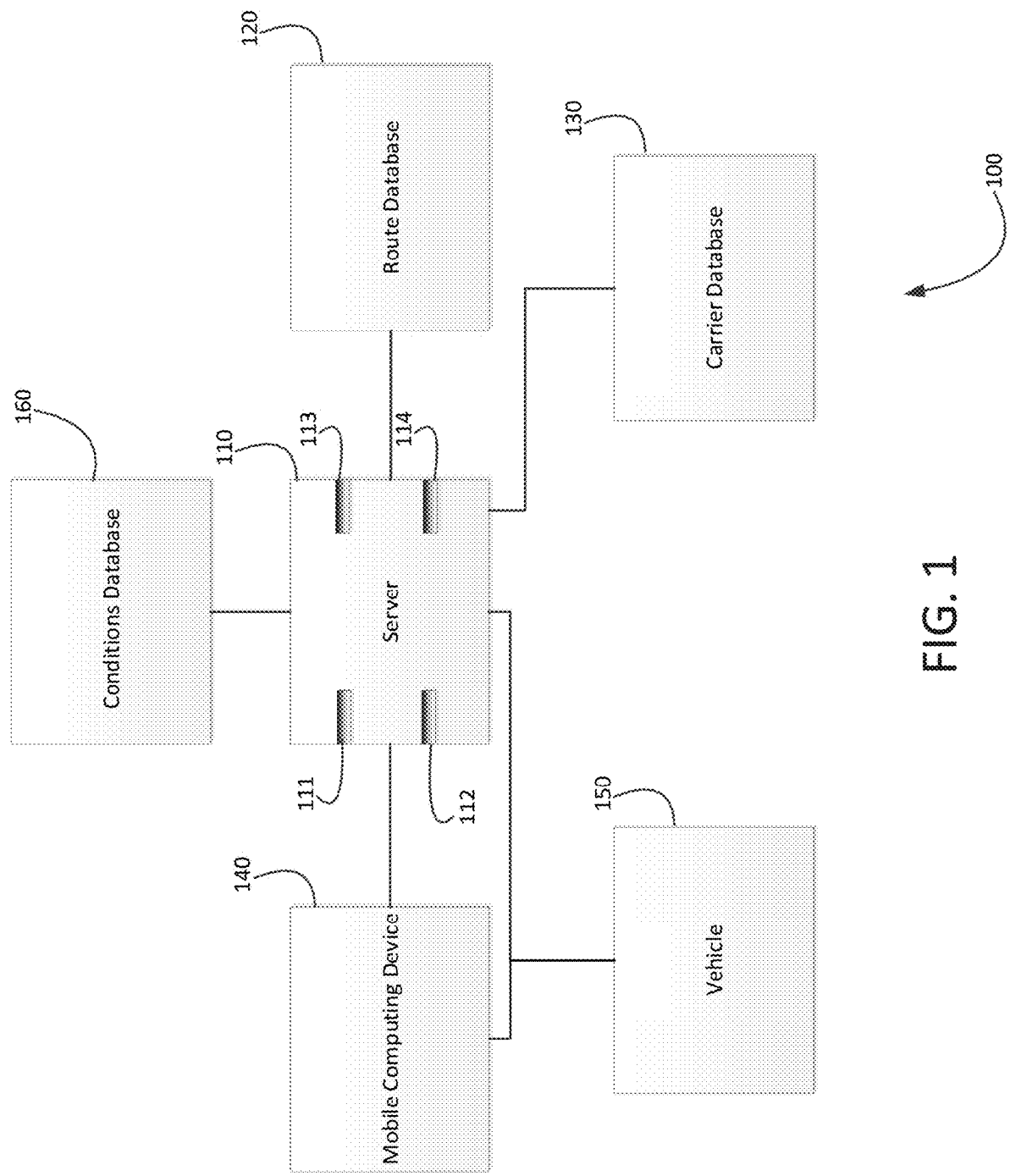
FIG. 1 is a block diagram of a system for route analysis.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term delivery resource may refer to a carrier, who can be an individual assigned to a route who delivers the items to each destination. The term may also refer to vehicles or equipment, such as trucks, trains, planes, automated handling and/or delivery systems, processing equipment, and other components of the distribution network.

As described herein, a distribution network may comprise processing facilities such as regional distribution facilities, hubs, and delivery unit facilities, and other desired levels. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or with many delivery unit facilities, and can sort and deliver items to the delivery unit facilities with which it is associated. In the case of the United States Postal Service (USPS), the delivery unit facility may be associated with one or more ZIP codes. The delivery unit facility receives items from local senders, and from hub level facilities or regional distribution facilities. The delivery unit facility also sorts and stages the items intended for delivery to destinations within the delivery unit facility's coverage area. The delivery unit facility may be associated with one or more delivery routes. A delivery route may comprise one or more route segments. The route segments can be related to physical geography or the route, such as block faces, etc. In some embodiments, a route can comprise segments such as delivery segments, driving segments, and the like. A route can be serviced by one or more carriers, and the delivery points along the delivery route are serviced at a given periodicity, such as every day, 6 days a week, 5 days a week, every other day, twice daily, or any other desired periodicity.

Properly understanding the details of a route, such as the physical layout of delivery points, route directions, rules of the road, driving requirements, obstacles, locations of item receptacles, and other features of a route can be important to ensure efficient and timely delivery of items. As described above, sorting of the items occurs at each level in the network and thus improving sorting efficiency can affect the efficient operation of the distribution network generally.

Historically, understanding all the details and features of a delivery route has required one or more delivery resources, such as a carrier and a supervisor, to walk the route in the normal course, in order to understand the details. This can be inefficient, can introduce human error, and happens too infrequently for proper understanding of a route and of changing route conditions. It can be advantageous to develop an automated system for analyzing and digitizing route conditions to improve efficiency, to allocate delivery resources based on the demands of a route, to track items being delivered, and to provide predictive delivery times.

Understanding a carrier route means that accurate route information needs to be gathered. The route information includes delivery point information, resource information, travel times, task completion times, and other information. Since processes and systems described herein rely on accurate delivery point information, it is advantageous to understand precise or accurate geographic location of delivery points. This can include geographic coordinates for delivery points along a route, such as latitude and longitude, GPS coordinates, or the locations using other coordinate systems. Knowing accurate geographic coordinates for each delivery point can help improve accuracy of the information obtained about resources delivering to routes. Accurate delivery point information can be obtained using systems and methods such as those described in U.S. application Ser. No. 16/386, 681, filed Apr. 17, 2019, the entire contents of which are hereby incorporated by reference.

It can also be advantageous to have accurate location and activity information for a delivery resource traversing a route and delivering to delivery points along the route. Location and activity information of the delivery resource can be obtained from breadcrumb data, such as GPS data, generated by a delivery resource's mobile computing device and/or by a vehicle. The mobile computing device or vehicle can generate and transmit breadcrumb data as a delivery resource traverses a route. The mobile computing device can also scan items, record information, and transmit scan and other information to a server or processor within the distribution network.

The breadcrumb data can be analyzed and characterized. For example, each breadcrumb can be associated with an activity, such as walking, driving, delivering an item, resting, waiting at an intersection, taking a break, eating lunch, turning left, etc. The breadcrumb data can be parsed or segmented according to route segments described elsewhere herein, such as by block face, neighborhood, street, geofence, and the like.

The breadcrumb data for each route can be collected every day, and can be processed or analyzed every day, or with another periodicity, to improve routing, improve efficiency, to provide predictive tools, and for any other desired activity. The data can be analyzed over a period of time to generate averages over a period of time. The data can be separated based on the individual or the plurality of delivery resources completing the route. The data can identify anomalies, such as changes to the route, unexpected turns, stationary times, out of boundary alerts, excessive relay times, and the like.

Each day the route is completed the system can automatically generate a summary and an exception report which identifies deviations from a normal baseline. A summary can be generated each day which can be automatically analyzed to identify potential efficiency gains or by a supervisor to determine if changes need to be made.

FIG. 1 is a block diagram of an exemplary system for route analysis. A system 100 includes a server 110, a route database 120, a carrier database 130, a mobile computing device 140, a vehicle 150, and a conditions database 160. The server 110 is in communication, either wired or wirelessly, with the route database 120, the carrier database 130, the mobile computing device 140, the vehicle 150, and the conditions database 160.

In some embodiments, the server 110 may comprise or be a component of a processing system implemented with one or more processors. The server 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The server 110 may comprise a processor 111 such as, for example, a microprocessor, an ARM or MIPS® processor, a Qualcomm Snapdragon® processor, a microcontroller, an Intel single or multiple core processor, such as i9®, i7®, i5®, or i3® processors, Apple A12, A14, etc. processors, Exynos processor, AMD Ryzen®, Phenom®, Athlon®, Aseries®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the expected delivery window generation system 100, and controlling access to and from, and transmitting information and data to and from the address analytical server system hub 110 and the constituent components of the expected delivery window generation system 100, as will be described herein.

The server 110 comprises a system memory 113, configured to store information, such as confidence data, item-carrier information, expected deliveries data and the like. The system memory 113 may comprise a database, a comma delimited file, a text file, or the like. The address analytical server system hub 110 is configured to coordinate and direct the activities of the components of the expected delivery window generation system 100, and to coordinate generating expected delivery windows for the delivery of items.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 communicates via cellular networks, WLAN networks, or any other wireless network. The communication feature 114 is configured to receive instructions and to transmit and receive information among components of the expected delivery window generation system 100, and in some embodiments, with a central server (not shown) or other resource outside the expected delivery window generation system 100, as desired.

The route database 120 can store information for a plurality of routes, including information for each delivery point along each of the plurality of routes. The delivery point information can include an accurate geographic location for each delivery point, including, for example, a location for the front door, item receptacle, or other device for each delivery point. The locations for the front door of a delivery point can be relevant to parcel or package delivery, which may not occur at an item receptacle, but at the front door, porch, etc. The item receptacle can be a mailbox or other similar device or location, and may be located at a different set of coordinates than the front door. The route database 120 also stores information about roads, driving rules, route maps including delivery point sequences, locations for turns, vehicle parking locations, for example, if the route includes a park-and-loop section or similar section, and any other information about the route. The route database 120 stores baseline information, for example, average transit times from the delivery unit facility to the first delivery point, transit times between route segments, average parcel volume, average letter mail volume, and other characteristics about the route.

The route database 120 can store maps of routes, including delivery points on maps and of boundaries associated with the routes. In some embodiments, the maps or routes from the route database 120 can be combined with information received from the mobile computing device 140 and the vehicle 150 for use in analyzing the carrier's route.

The route database 120 further stores geofence information for delivery points and other locations relevant to the plurality of routes. For example, the route database 120 can store geofences surrounding a delivery unit facility associated with one or more of the plurality of routes, each of the delivery points, other facilities, and the like. A geofence can be a virtual boundary drawn around a point, with the boundaries being located at a determined distance from the point. The boundary need not be a regular shape, need not have a constant dimension, but can be adapted or moved, or the dimensions changed as desired.

The route information in the route database 120 is also updated routinely or periodically as the processes in here occur and determine route updates. The updated routes can form a new baseline for route information.

The carrier database 130 contains information regarding a plurality of carriers, including information correlating each carrier to the route information stored in the route database 120. For example, a route may be serviced by one carrier routinely, but may be serviced intermittently by another carrier. The route's averages, or baseline performance may be different for each carrier, based on, for example, the carrier's familiarity with the route. Other information can be stored in the carrier database, such as carrier experience level, carrier identifier information, such as log-in information, carrier time availability, carrier schedules, and the like.

The carrier database 130 can store an assignment or association for each carrier and the assigned route. The carrier database 130 can also store information related to item volume for a carrier for a given route. The carrier database 130 can store information about an estimated completion time for each carrier and for each route. This information can be used, for example, if a carrier needs to pivot, substitute for another carrier, or if item volume is too high such that a single carrier cannot complete the route in a given period of time. The carrier database 130 can also store information regarding delivery resource work time, such as presence in a facility, a clock-in or clock-out, a time working in the facility, for example, when casing items or preparing for a route, and a time when the carrier moves to a delivery route.

The mobile computing device is in wired or wireless communication with the server 110. The mobile computing device has an internal location circuit, such as a GPS circuit, which records GPS locations continuously, or at a set periodicity. The mobile computing device 140 can also include an accelerometer and/or gyroscope. The mobile computing device 140 can include an input device, such as a keypad or a touchscreen, a display, a scanning device, such as a barcode reader, optical scanner, and the like. The scanning device can be used to scan an item, such as a letter or parcel, when the item has been delivered. The mobile computing device 140 can be a smartphone, tablet computer, or specially or purpose-built computing device, such as the mobile delivery device used by USPS personnel.

The mobile computing device can transmit information, including geographic location track information, such as breadcrumbs, and other data at a set periodicity, such as every 0.01 seconds, every 0.05 seconds, every 0.1 seconds, every 0.5 seconds, every second, every 2 seconds, every 5 seconds, every 10 seconds, etc. In some embodiments, the mobile computing device 140 records breadcrumb data at 1 second intervals, and the data is transmitted to the server in real time, or in near-real time, such as every second, every minute, every five minutes, or other periodicity. In some embodiments, the mobile computing device 140 is connected to a base or port after a route is completed, and all the location information and other information, including accelerometer, gyroscope, scan information, etc., is transmitted to the server 110.

The vehicle 150 can be a delivery vehicle, such as a mail carrier vehicle, a truck, train, car, or any other vehicle used in item distribution. The vehicle 150 can include a plurality of sensors, such as a location circuit like GPS, vehicle position sensors, speed and direction sensors, and the like. The vehicle 150 can transmit vehicle information to the server 110 via a wired or wireless network. In some embodiments, the vehicle 150 connects via a wired or wireless connection to the mobile computing device 140 and transmits information to the mobile computing device 140, which can, in turn transmit information to the server 110.

As a delivery resource performs a route, location and route data will be obtained via the mobile computing device 140 and/or the vehicle 150, and transmitted to the server. This location and route data can include geofence events such as "depart facility" and "return facility". These geofence events can be detected when the delivery resource assigned to a route exits a unit delivery facility geofence stored in the route database. The server 110 receives location information from the mobile computing device 140 and/or the vehicle 150, and compares the location information to the geofence information in the route database. When the location of the mobile computing device 140 is detected outside of the geofence for the unit delivery facility, a "depart facility" event may be logged. In some embodiments, the breadcrumb data for a period of time prior to the detected location outside the geofence will be analyzed as part of the depart facility event. If the breadcrumb data shows that the mobile computing device 140 was within the geofence for an amount of time prior to the detection outside the geofence, then the "depart facility" event is logged.

The opposite process can occur to detect a "return facility" event. For example, when a mobile computing device 140 is first detected within a geofence of a delivery facility, the server 110 can determine a "return facility" event has occurred, or the prior breadcrumb data can be reviewed to see if the prior breadcrumbs were outside the geofence for a given time frame. If so, then a "return facility" event is determined. In some embodiments, the server 110 may determine a "depart facility" or "return facility" event has occurred after several consecutive locations have been received indicating a location outside the geofence, in order to minimize the effects of a single erroneous location measurement.

The location and route data can also include geo-events. The geo-events can be determined based on geofences, can be triggered by other actions of the delivery resource, such as scanning an item, or can be inferred based on subsequent events. Geo-events logged can include "first delivery," "last delivery," "outside route boundary," travel events, lunch breaks, scanning events, relay events, pivots, stationary time, and walk or drive status. The "first delivery" and "last delivery" can determined when the delivery resource approaches, nears, is located at or within the location of the first delivery point or last delivery point in sequence along a route.

Additional events that can be received and stored can be based on mobile computing device 140 and/or vehicle 150, including, customer contact, animal interference, sorting or dividing mail on route, traffic stops, hazardous conditions, seatbelt status, condition of item receptacles, position of item receptacles. Many of these events can be input into the mobile computing device 140 when the delivery resource encounters them. Where an event is temporary or transitory, such as an animal encounter, customer contact, traffic stop, or hazardous condition, the delivery resource can identify the event so as to identify why there may have been a delay or alteration to a route, and that event can be excluded from updating average time or base route information.

In some embodiments, where the condition is not temporary or transitory, such that it may impact deliveries for several days or more, such as a hazardous condition, condition and placement of item receptacles, etc., these events can be identified and incorporated into average time and baseline route information.

The conditions database 160 can contain information regarding conditions that may affect performance of deliveries along delivery routes. The conditions database 160 can be in communication with one or more external data sources, such as weather, traffic, civic, governmental, or other sources. The conditions database can provide the server 110 with information regarding adverse weather, road work, civil unrest, or other conditions that could delay or impact route performance. These conditions can be used by the server 110 to determine whether route information received for a route for a given day should be used to set average times or baseline route information. The server 110 may also use this information to flag route information to account for otherwise unexpected delays.

Figure 2:
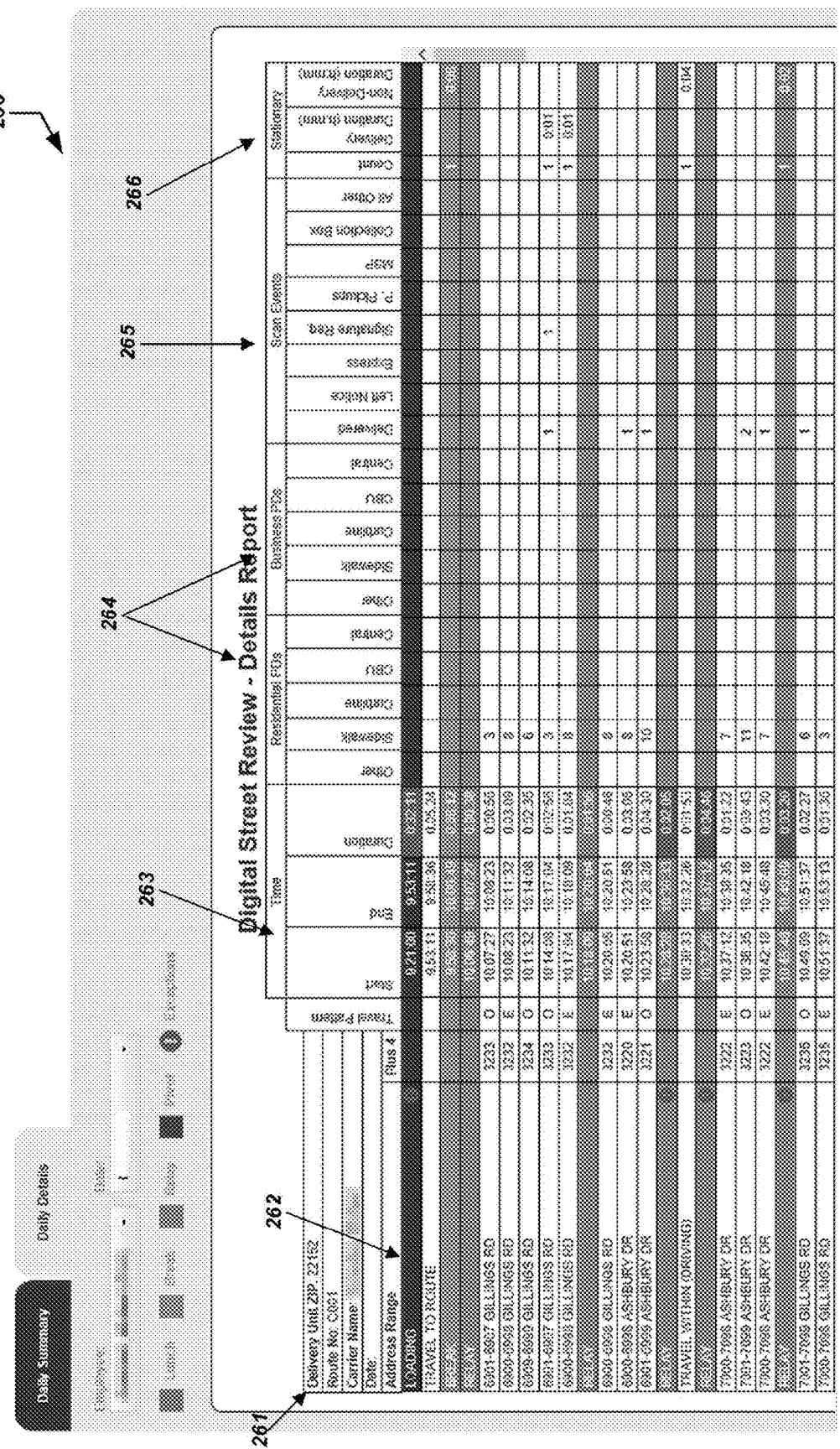
FIG. 2 depicts an exemplary extract of route information for a particular route and delivery resource.

FIG. 2 depicts an exemplary extract of route information for a particular route and delivery resource. A table 200 depicts a detailed report generated based on the information obtained from the mobile delivery device 140 incorporated with route information from the route database 120. The table 200 can be viewable or available via a computer program or application. The table 200 includes a plurality of fields and data for the performance of deliveries along a given route for a given day. A route information section 261 includes information identifying the route being analyzed and the identity of the carrier servicing the delivery route. An event column 262 lists the types of events and route segments for the route. As seen in FIG. 2, events can include loading, which can happen at the delivery facility prior to departure. Other events include travel to the route or travel within the route, breaks, relays, and block faces. For example, the route segment 6901-6907 Gillings Road, and others are shown in FIG. 2. Only a small portion of all the events and route segments for route No. C001 are shown in FIG. 2.

The table 200 includes a time section 263. The time section determines a start time, an end time, and a duration for each event listed in the event column 262. The start and end times are determined using geolocation information received from the mobile computing device 140 integrated or overlaid with the route information from the route database 120. By receiving information regarding locations and the times at which those locations are detected, the server 110 can generate the time section 263. The server can analyze each duration, each start time, and/or each end time to determine whether any of the time entries exceed a threshold parameter, or if they look longer than expected. In some embodiments, the server 110 can compare the start, end and/or duration times for the date of the table 200 with start, end, and duration times from the baseline route information or the average route information. If a discrepancy, anomaly, or exception is identified, a notification, highlight, or other indicator can be generated. For example, in the time section 263 for the loading duration, the duration value is highlighted in a different color, for example, red, indicating that the loading duration is an anomaly or an exception.

The delivery point section 264 includes columns identifying the types of delivery points along a route. The delivery points can be residential or business, and they may be of several types. As shown, the types of delivery points can be categorized based on the location of the item receptacle or mailbox. As can be seen, on the 6901-6907 Gillings Road blockface, there are 3 delivery points categorized as "sidewalk." This means that the mailboxes are along the sidewalk, and are likely accessible via a vehicle driving along the road or walking along the sidewalk. This can indicate that a delivery point along the sidewalk should take less time than a mailbox which is located off the street, requiring a delivery resource to deviate farther from the line of travel down the sidewalk. Other delivery points can be categorized as curbline, a CBU, which can be a cluster of boxes within a neighborhood, a central box, such as in an apartment building, or other, such as a door slot, front door, etc.

A scan event column 265 shows each occurrence of a scan event, where a delivery resource scanned an item while on the route. The existence of a scan event can indicate delivery of a parcel or other similar item, which may take longer than putting an item like a letter in a mailbox. Additionally, a scan event corresponding to a parcel can indicate that the carrier left the sidewalk to go to a front door or porch to deliver. The server 110 can correlate the scan event with GPS breadcrumb data to confirm the deviation or the movement from the straight line of travel, or travel along the road or sidewalk. If a route takes longer than the average time or the route baseline describes, the server 110 can look for scan events, and can evaluate these points differently than evaluating other points, because it is assumed the time to complete a delivery to a porch or front door will take longer than the time to deliver to a CBU, curbline delivery point, etc. The server 110 can also obtain average parcel or package volume for a route from the route database 120 and other item tracking sources within a distribution network, and can use that information to update the average times or the baseline route timing.

Scan events can occur when a parcel is delivered, but they can also occur when a notice, such as a re-delivery notice, is left, when an item having a particular service class is delivered, such as an overnight item, first class, etc., when a signature is required on delivery, when a pick-up is performed, and upon other events. These times can all be used to determine whether the received times and durations are anomalous or are expected, or are an exception to a delivery stop where there are no special activities.

A stationary time column 266 identifies times where the delivery resource was stationary. The server 110 may make a stationary determination when two or more consecutive breadcrumbs indicate the same location. The server 110 can analyze the stationary times and cross reference those stationary times with other events, such as scan events, or road conditions or maps, such as maps of the area. A stationary time entry may indicate that the carrier was finding a parcel within the vehicle, if the stationary breadcrumbs occur within a geofence of a delivery point before a scan event at that delivery point. If the stationary breadcrumb occur at a traffic signal or intersection, the stationary breadcrumb can be inferred as the delivery resource stopped at a stop sign, stopped at a stop light, waiting to turn left, etc. The server 110 identifies the stationary time locations, and evaluates them in the context of the map, to identify a potential reason for the stationary event. In some embodiments, the server 110 can also evaluate breadcrumbs, scan event data, and/or accelerometer/gyroscope data just before and just after the stationary time to make a decision regarding the nature of the stationary event.

For example, if a carrier is moving at a driving speed, then a 1 minute stationary event is detected, and then the carrier accelerates to driving speed and a left turn is detected, the stationary event can be interpreted as routine, waiting in traffic or at a traffic light. If the carrier was walking at a normal speed, then a stationary time occurs, followed by a resume to walking, a carrier break can be inferred, or other activity can be inferred.

In some embodiments, the server 110 can determine that the carrier is at a delivery point which has a high receptacle density, such as a cluster box, or at an apartment building having a central area with multiple boxes for items. Where the location of the stationary event corresponds to a known CBU or central unit, for example, the server 110 can determine that the carrier is delivering items to a CBU or central unit. These are exemplary only, and are not intended to be limiting examples.

Figure 3:
FIG. 3 depicts a carrier route overlaid on a map of the delivery area. A portion of the route is depicted here.

FIG. 3 depicts a carrier route overlaid on a map of the delivery area. A portion of the route is depicted here. The map and route are generated by the server 110 using the determinations and data described above. The route depicted is overlain on the map and is determined to be a park and loop type route, where the carrier drives a vehicle to a designated point, parks the vehicle, and then delivers on foot in a loop back to the vehicle. The carrier then drives the vehicle to a next position where the process repeats. The map shows the breadcrumb data obtained from the delivery resource. The map depicts in a first color, the driving path 270, or the path travelled while driving in a vehicle. The map depicts in a second color, the walking path 271, and in a third color, stationary time 272. As shown, walking path section 271a shows a deviation in path from a road or sidewalk and to a location, such as a front door or porch, corresponding to delivering an item. This delivery can correspond to a scan event from the route information. The stationary time 272 can occur at each item receptacle, front porch, or door. The stationary time 272 can also occur at the park and loop points. Stationary points which are determined to be the parking points of the vehicle can be indicated by a pin or pointer. The pin and pointer can be hovered over or clicked on to bring up information about the parking points, such as the relay time pop-up seen in FIG. 3. The relay times can show the time that the vehicle was parked and departed the parking point, and the time where the delivery resource was walking the loop.

Although not depicted on FIG. 3, each point, or segment of the route can be hovered over or clicked to bring up information about the point or segment. For example, a stationary segment can be selected, and the server 110 can provide information about the stationary segment, including the start/stop times, duration, the category of stationary activity (e.g., traffic stop, break, scan event at a porch, CBU, etc.). Similarly, based on the line of travel, the server 110 can identify a departure from a generally straight line of travel, or a line of travel that follows the sidewalk. This can indicate that the delivery resource approached a door, that a delivery point has a long driveway, an obstacle was avoided, etc. These segments, although not shown as a different color or shade in FIG. 3 can be highlighted on a map.

The server 110 can prepare maps such as depicted in FIG. 3. The server 110 can provide visual maps for supervisors, carriers, or other delivery resources. The server 110 need not generate a map in order to perform the analysis described herein, but it may.

Figure 4:
FIG. 4 depicts an exemplary route having route information and delivery information overlain.

FIG. 4 depicts an exemplary route having route information and delivery information overlain. The route can have a route boundary 275 established for the route. The route boundary 275 encompasses all the delivery points assigned to the route, or to the route segments, or to a subset of route segments. The driving path 270, the walking path 271 and the stationary time 272 are depicted within the route boundary 275. Some portions of the driving path 270 occur outside the route boundary 275. The server 110 can identify location data or breadcrumb data that corresponds with points outside of the route boundary 275. The server 110 can flag these breadcrumbs and indicate that they are out of bounds travel 276.

The server 110 can analyze the breadcrumb data for the out of bounds travel 276 to determine whether the out of bounds travel 276 occurs regularly for the carrier traversing the route, whether they are anomalies etc., by comparing a current days route information and delivery information with average or baseline route data, and/or with route and delivery data for a preset period, e.g., previous two weeks, a random selection of days, and the like.

If the out of bounds travel 276 occurs with some regularity, such as once a week, twice a week, every day, or any other desired period, the server 110 can identify the out of bounds travel 276 as non-anomalous and can generate a notification and/or take additional analytical steps. For example, the server 110 can analyze the directionality of the breadcrumb data to identify any turns, alterations, deviations, etc. As shown in FIG. 4, the out of bounds travel 272 segments extend along a road in a direction leaving the route boundary 275, travel a little way down the road, do a U-turn and return back to the route boundary 275. When a U-turn is identified, the server 110 can determine whether a route boundary 275 should be extended to avoid an out of bounds alert. For example, it may be that the only place to do a U-turn for a given route is outside the route boundary.

The server 110 can also determine what actions occur at the U-turn point. For example, if there is walking path 271 data out of bounds coupled with stationary time 272, this can indicate that a delivery point is actually located at a geographic point outside the boundary. This portion can be flagged and the geographic coordinates for the delivery point nearest the out of bounds travel 276 can be compared and any discrepancy can be resolved. In some embodiments, the discrepancy can be resolved over the course of several days of data showing the same path, and not showing any stationary time 272, or very limited stationary time 272 at the location where the server 110 believes the delivery point to be.

In some embodiments, as the carrier is traversing the route, and data is being transmitted to the server 110 in real-time or near real-time, the server 110 can identify out of bounds travel 276, and can push a notification to the mobile computing device 140 alerting the carrier to the out of bounds travel 276. In some embodiments, the mobile computing device, at the request of the serve 110, can require or ask the carrier to provide an input or a response to the out of bounds travel 276. The carrier can move to the actual delivery point, and/or can indicate that the delivery point may be out of the route boundary 275. The server 110 can evaluate such a response and determine whether to change the route boundary 275.

In some embodiments, the server 110 can make these determinations in any order desired, and may omit one or more of the steps described above. In some embodiments, the server 110 can automatically make adjustments, or may request that a supervisor or other delivery resource provide further instructions, or confirm changes proposed by the server 110.

Figure 5:
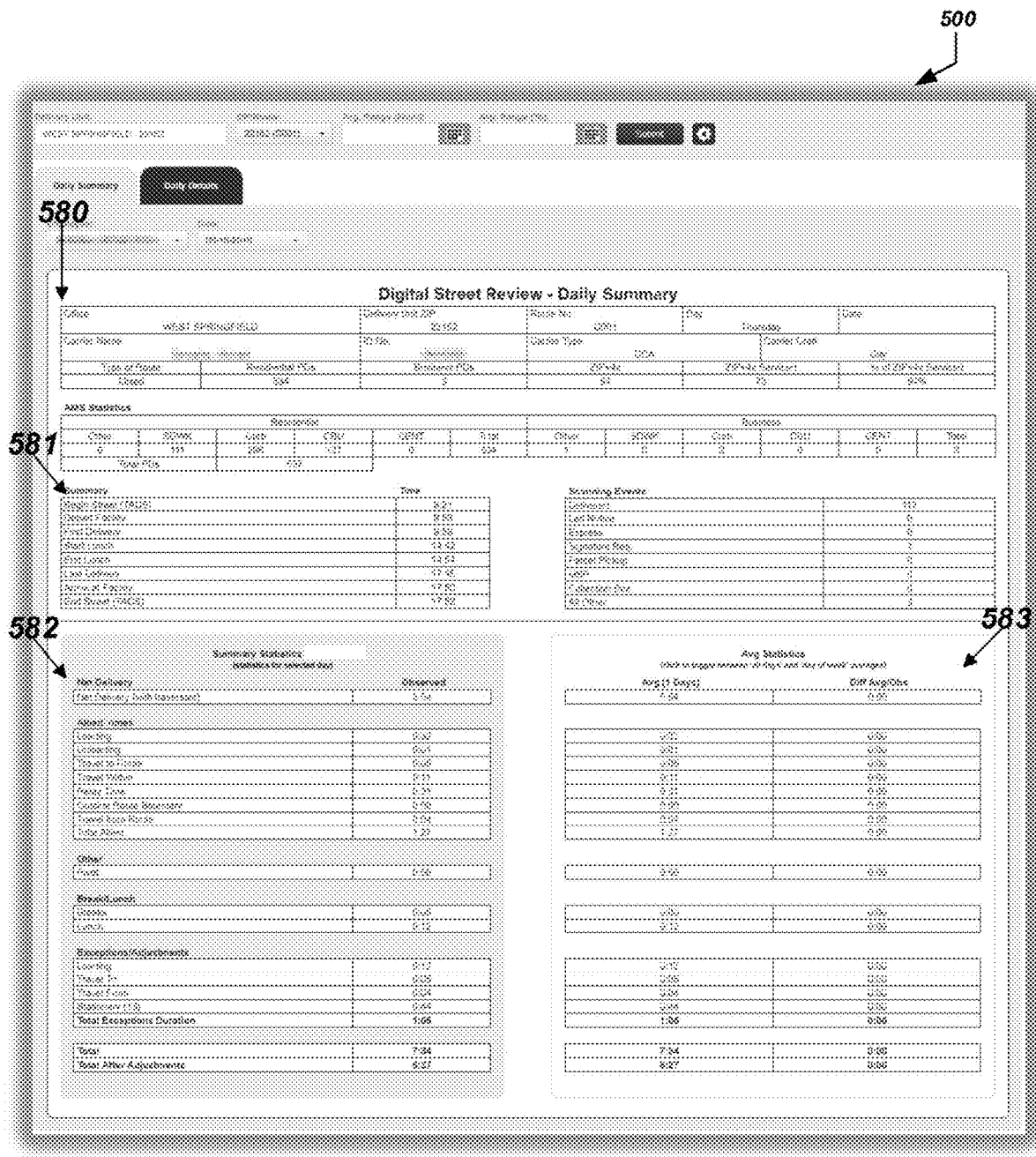
FIG. 5 depicts an exemplary route summary screen from a user interface.

FIG. 5 depicts an exemplary route summary screen from a user interface. A summary page 500 displays the results of the delivery resource's route traversal. A route overview section 580 provides route specific information, such as the route identifier, the route location, the number of delivery points on the route, and other information. Summary section 581 summarizes times for the route, including route start time, depart facility, first delivery, lunch start and end, last delivery, return facility, and end time. The summary section 581 also summarizes the number of scan events, such as scanned parcels delivered, signature require notices, etc. The time summary section 582 provides time durations for various activities that occurred as the carrier traversed the route, including loading, travel to route, travel within route, breaks, exceptions such as pivots, additional pick-ups, etc. The average section 583 shows what the average durations are for the same activities. The average section 583 can take a rolling average of times from a previous time period, such as one month, 60 days, two weeks, a year, or any other time period. The server 110 can compare the average times to the actual times for a given day and can identify any anomalies or excessive differences between the two. In some embodiments, the average statistics can be established for each day of the week, for each month, quarter, etc. For example, the server can generate average or baseline route information for each day of the week. There can be a Monday average or baseline, a Tuesday average or baseline, and so on. In some embodiments, the averages are established monthly, since volume of items tends to fluctuate according to the month of the year, which months occurring around holidays generally having a higher volume of items. In some embodiments, the average range can be set by a supervisor, and various average ranges can be used in evaluating a day's delivery performance.

Thus, if the route information in the summary page 500 is for a Tuesday, the averages or baseline information will be based on only prior Tuesdays. If the route information in the summary page 500 is for a day in December, the averages can be displayed from the previous December. This can ensure that evaluations are consistent based on known trends or known volume fluctuations.

The server 110 can identify additional information from the route information and delivery information, including mid-route returns to facilities, gas station visits, back tracking, partial loops and the like. The server 110 can identify these occurrences and can run an optimizing program to resequence delivery points on a route in order to prevent or minimize back tracking. If a gas station visit occurs frequently at the same time of day, or after a certain delivery point, but the gas station is not close to or along the route, the server 110 can identify an earlier time to get gas, or identify a gas station along the route at an earlier point in the route.

The server 110 can identify or predict delivery times based on the route information and delivery data suing the average or baseline information. When a package is to be delivered at a given location and a delivery window is requested, a delivery window can be calculated based on the known time it takes to complete the delivery points before the delivery point having the package for delivery.

Figure 6:
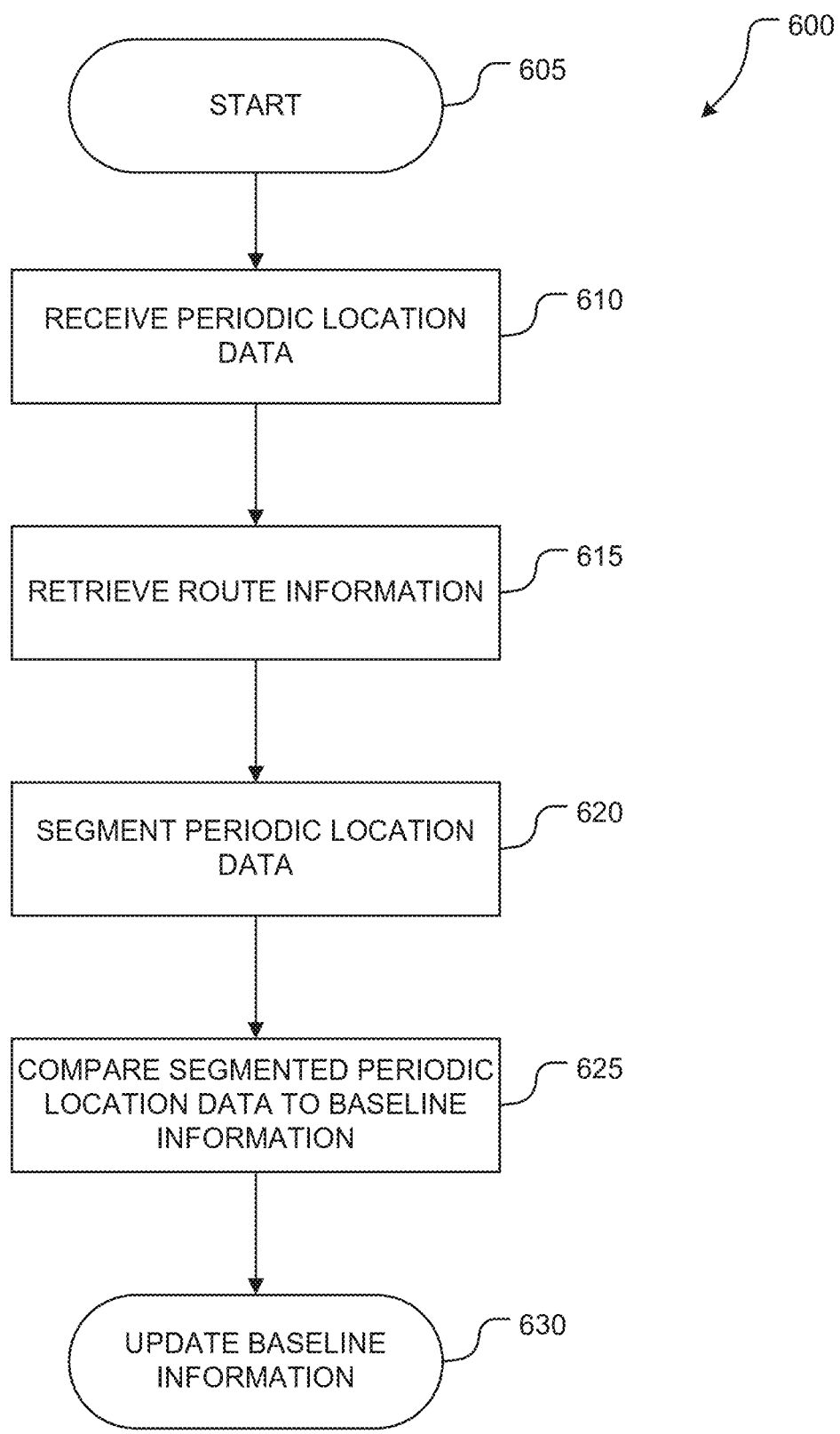
FIG. 6 is a flow chart illustrating an example delivery route management method in accordance with the present technology.

FIG. 6 is a flow chart illustrating an example method 600 of managing a delivery route in accordance with the present technology. The method 600 may be implemented in accordance with any delivery route in a distribution network. In some embodiments, the method 600 may be implemented using components of the system 100 of FIG. 1. For example, the method 600 may be performed at least in party by a server 110 in conjunction with location data received from a mobile computing device 140 and/or information stored in a route database 120, a carrier database 130, and/or a conditions database 160.

The method 600 begins at block 605. The method 600 may be initiated on a periodic basis or based on an event. For example, individual delivery routes of a distribution network may be analyzed and updated every day, every week, every month, every quarter, etc., based on new location data received since the previous analysis of the delivery route by the method 600. In some embodiments, the method 600 may be performed on a shorter periodic basis, such as every minute, every hour, etc. while a delivery resource is servicing a delivery route. In another example, the method 600 may be initiated each time a mobile computing device 140 transmits location data to the server 110, such as when a delivery resource finishes servicing the delivery route on a given day, or when the mobile computing device 140 transmits location data during servicing of the delivery route. When delivery route management is initiated, the method 600 continues to block 610.

At block 610, period location data is received. For example, the server 110 may receive the periodic location data transmitted by a mobile computing device 140. The periodic location data includes a number of location data points generated at the mobile computing device 140 on a periodic basis. For example, the mobile computing device 140 may generate a location data point based on GPS or other location technology, every 0.1 second, every 0.5 second, every second, every five seconds, every ten seconds, or longer, or at any other suitable interval. In some embodiments, the periodic location data is breadcrumb data collected at a constant interval to provide a record of a delivery resource's movement while servicing a delivery route. When the server 110 has received the periodic location data, the method 600 continues to block 615.

At block 615, route information is retrieved. For example, the server 110 may retrieve route information from the route database 120, such as baseline information, delivery point information, and the like. The server 110 may also retrieve information from the carrier database 130 and/or the conditions database 160. The baseline information may include data such as an average duration of the route and/or of segments of the route, for example, as described with reference to FIGS. 2 and 5. In some embodiments, the baseline information may be modified in view of information corresponding to the route in the conditions database 160 and/or information corresponding to the delivery resource servicing the route in the carrier database 130. When the route information has been retrieved, the method 600 continues to block 620.

At block 620, the periodic location data is segmented into events and route segments for the delivery route based at least in part on the route information. For example, breadcrumb data collected at a mobile computing device 140 can be segmented into route segments and events as shown in FIG. 2, based on geofence data associated with the events and route segments. Based on the segmented periodic location data, a duration can be determined for each event and route segment based on timestamps associated with the periodic location data points. For example, the timestamp of a first location data point within an event or route segment can be subtracted from the timestamp of a last location data point within the event or route segment to determine the duration of the event or route segment. When the periodic location data has been segmented, the method 600 continues to block 625.

At block 625, the segmented periodic location data is compared to the baseline information. In one example, the server 110 may compare the durations of the individual events and route segments of the segmented periodic location data to the stored baseline durations corresponding to the same events and route segments. Accordingly, the server 110 can determine, for some or all of the events and route segments, if the delivery resource took an expected amount of time, less time than expected, or longer than expected to complete the route segment or event. In some embodiments, the server 110 may also identify any deviations from the delivery route based on the location data. When the segmented periodic location data has been compared to the baseline information, the method 600 continues to block 630.

At block 630, the baseline information is updated. For example, the server 110 may change one or more portions of the baseline information in the route database 120 corresponding to the analyzed delivery route. The server 110 may additionally update information corresponding to the delivery route in the conditions database 160 and/or information corresponding to the delivery resource in the carrier database 130. A variety of updates and additional actions may be performed at block 630. In one example, the durations corresponding to individual events and route segments may be changed such as by adding the most recent durations into the calculation of an average time stored in the baseline information, or by changing a baseline duration allotted to a particular event or route segment. In another example, the server 110 may adjust the delivery route itself, for example, by changing a driving direction based on a detected recurring deviation, shifting one or more delivery points to a different route or adding delivery points from a different route based on the delivery route repeatedly taking more or less time than expected. The server 110 may schedule additional delivery resources to service some or all of the delivery route on a permanent or temporary basis, for example, based on delays, changing route conditions, and the like.

In some embodiments, the server 110 may cause one or more alerts or notifications to be sent based on the analysis of the delivery route in method 600. For example, if a deviation from the delivery route is detected in real time or near-real time, the server 110 may cause the mobile computing device 140 to display an alert to the delivery resource regarding the deviation. The alert may further comprise one or more instructions or requests for input, such as an instruction to return to the planned route and/or an option to input a reason for the deviation.

In other examples, the server 110 may determine one or more delivery windows based on the analysis of the delivery route. For example, the server may determine an expected time window in which each route segment is typically performed each day the route is serviced. When a delivery is expected for a tracked item or other item for which a delivery window is desired by a sender or recipient, the server 110 may generate an expected delivery window based on the expected time window corresponding to the route segment in which the delivery is to occur. In some embodiments, the server 110 may cause the expected delivery window to be updated, for example, based on a delay encountered by a delivery resource along the delivery route prior to the delivery.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A delivery route management system comprising:
a route database, the route database storing route information corresponding to a plurality of delivery routes of a distribution network, the route information comprising baseline information corresponding to individual delivery routes of the plurality of delivery routes;
sorting equipment located at a distribution facility associated with the plurality of delivery routes and configured to automatically sort items intended for delivery via the plurality of delivery routes;
a plurality of mobile computing devices configured to be carried by delivery resources of the distribution network, each mobile computing device configured to:
generate periodic location data while being carried by a delivery resource servicing a delivery route of the plurality of delivery routes, the periodic location data comprising a plurality of location data points; and
transmit the periodic location data to the server via the network;
wherein, for the individual delivery routes; and
a server in communication with the route database, the sorting equipment, and the plurality of mobile computing devices, the server configured to:
receive, from the mobile computing device carried by the individual delivery resource servicing the delivery route, the periodic location data corresponding to the delivery route for a given day;
segment the periodic location data into a plurality of events and route segments for the delivery route based on the plurality of location data points and on route information in the route database corresponding to the delivery route, each route segment comprising a portion of the delivery route including one or more delivery points, at least some of the events being associated with locations other than the delivery points;
compare durations of individual events or route segments of the segmented periodic location data to baseline durations corresponding to the same individual events or route segments in the baseline information in the route database corresponding to the delivery route;
update the baseline information corresponding to the delivery route in response to comparing the durations of individual events or route segments of the segmented periodic location data to baseline durations corresponding to the same individual events or route segments in the baseline information corresponding to the delivery route; and
after receiving the periodic location data corresponding to the delivery route for a plurality of days:
determine, based on the comparison for the plurality of days, that at least a portion of the route repeatedly takes more or less time than expected;
shift, in response to determining that at least a portion of the route repeatedly takes more or less time than expected, one or more delivery points from the delivery route to another delivery route of the plurality of delivery routes or shift one or more delivery points to the delivery route from another delivery route of the plurality of delivery routes to generate a modified delivery route;
cause the sorting equipment to automatically sort, in accordance with the modified delivery route, items received at the distribution facility and intended for delivery to delivery points of the delivery route and the other delivery route; and
cause the individual delivery resource or another delivery resource to service the modified delivery route for subsequent days.

2. The system of claim 1, wherein updating the baseline information corresponding to the delivery route comprises changing an average time associated with a first route segment of the plurality of events and route segments for the delivery route based on a time duration associated with the first route segment in the segmented periodic location data.

3. The system of claim 1, wherein the baseline information in the route database comprises, for the individual delivery routes, individual baseline data sets associated with specific weekdays, months, or quarters.

4. The system of claim 3, wherein updating the baseline information corresponding to the delivery route comprises updating an individual data set associated with a weekday, month, or quarter corresponding to the given day.

5. The system of claim 1, wherein the route information further comprises geographical route boundary information corresponding to the individual delivery routes.

6. The system of claim 5, wherein the server is further configured to:
detect out of bounds travel by a delivery resource based on the periodic location data and the geographical route boundary information; and
cause the mobile computing device carried by the delivery resource to provide a notification to the delivery resource indicative of the out of bounds travel.

7. The system of claim 5, wherein the server is further configured to:
detect recurring out of bounds travel associated with a portion of an individual delivery route; and
modify the route information corresponding to the individual delivery route based on the recurring out of bounds travel.

8. The system of claim 1, wherein the route information further comprises geofence data associated with particular events or route segments of the plurality of events and route segments, and wherein the server segments the periodic location data based at least in part on the geofence data.

9. The system of claim 1, wherein the server is further configured to provide an expected delivery window to a customer of the distribution network based on the route information.

10. The system of claim 1, wherein each mobile computing device is further configured to:
receive, from the delivery resource, route condition information associated with individual route segments; and
transmit the route condition information to the server;
wherein the server updates the baseline information based at least in part on the route condition information.

11. The system of claim 1, wherein updating the route information comprises changing one or more driving directions along the delivery route, adding one or more delivery points to the delivery route, or removing one or more delivery points from the delivery route.

12. A delivery route management method comprising:
receiving, at a server, periodic location data transmitted by a mobile computing device carried by a delivery resource servicing a delivery route, the periodic location data comprising a plurality of location data points corresponding to the delivery route for a given day;
retrieving, from a route database in communication with the server, route information for the delivery route comprising baseline information corresponding to the delivery route;
segmenting, by the server, the periodic location data into a plurality of events and route segments for the delivery route based on the plurality of location data points and on the route information for the delivery route, each route segment comprising a portion of the delivery route including one or more delivery points, at least some of the events being associated with locations other than the delivery points;
comparing, by the server, durations of individual events or route segments of the segmented periodic location data to baseline durations corresponding to the same individual events or route segments in the baseline information corresponding to the delivery route;
updating, by the server, the baseline information corresponding to the delivery route in response to comparing the durations of individual events or route segments of the segmented periodic location data to baseline durations corresponding to the same individual events or route segments in the baseline information corresponding to the delivery route; and
after receiving the periodic location data corresponding to the delivery route for a plurality of days:
determining, based on the comparison for the plurality of days, that at least a portion of the route repeatedly takes more or less time than expected;
shifting, in response to determining that at least a portion of the route repeatedly takes more or less time than expected, one or more delivery points from the delivery route to another delivery route of the plurality of delivery routes or shifting one or more delivery points to the delivery route from another delivery route of the plurality of delivery routes to generate a modified delivery route;
causing sorting equipment located at a distribution facility associated with the delivery route to automatically sort, in accordance with the modified delivery route, items received at the distribution facility and intended for delivery to delivery points of the delivery route and the other delivery route; and
causing the individual delivery resource or another delivery resource to service the modified delivery route for subsequent days.

13. The method of claim 12, wherein updating the baseline information corresponding to the delivery route comprises changing an average time associated with a first route segment of the plurality of events and route segments for the delivery route based on a time duration associated with the first route segment in the segmented periodic location data.

14. The method of claim 12, wherein the baseline information corresponding to the delivery route comprises individual baseline data sets associated with specific weekdays, months, or quarters.

15. The method of claim 14, wherein updating the baseline information corresponding to the delivery route comprises updating an individual data set associated with a weekday, month, or quarter corresponding to the given day.

16. The method of claim 12, wherein the route information for the delivery route further comprises geographical route boundary information corresponding to the individual delivery routes.

17. The method of claim 16, further comprising:
detecting out of bounds travel by the delivery resource based on the periodic location data and the geographical route boundary information; and
causing the mobile computing device to provide a notification to the delivery resource indicative of the out of bounds travel.

18. The method of claim 16, further comprising:
detecting recurring out of bounds travel associated with a portion of the delivery route; and modifying the route information for the delivery route based on the recurring out of bounds travel.

19. The method of claim 12, wherein the route information for the delivery route further comprises geofence data associated with particular events or route segments of the plurality of events and route segments, and wherein the periodic location data is segmented based at least in part on the geofence data.

20. The method of claim 12, further comprising providing an expected delivery window to a customer of the distribution network based on the route information.

21. The method of claim 12, further comprising:
receiving, from the mobile computing device, route condition information associated with individual route segments of the delivery route; and
updating the baseline information based at least in part on the route condition information.

22. The method of claim 12, wherein updating the route information comprises changing one or more driving directions along the delivery route, adding one or more delivery points to the delivery route, or removing one or more delivery points from the delivery route.

* * * * *